United States Patent
Lahav et al.

(10) Patent No.: US 7,958,336 B2
(45) Date of Patent: Jun. 7, 2011

(54) SYSTEM AND METHOD FOR RESERVATION STATION LOAD DEPENDENCY MATRIX

(75) Inventors: Sagi Lahav, Bialik (IL); Guy Patkin, Beit-Yanay (IL); Zeev Sperber, Zichron Yaakov (IL); Herbert Hum, Portland, OR (US); Shih-Lien Lu, Portland, OR (US); Srikanth T. Srinivasan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 437 days.

(21) Appl. No.: 12/164,666

(22) Filed: Jun. 30, 2008

(65) Prior Publication Data

US 2009/0328057 A1 Dec. 31, 2009

(51) Int. Cl.
*G06F 9/30* (2006.01)
(52) U.S. Cl. .......................................... 712/216
(58) Field of Classification Search ................. None
See application file for complete search history.

(56) References Cited

U.S. PATENT DOCUMENTS

| | | | |
|---|---|---|---|
| 5,201,057 A * | 4/1993 | Uht | 712/18 |
| 5,655,096 A * | 8/1997 | Branigin | 712/200 |
| 5,710,902 A * | 1/1998 | Sheaffer et al. | 712/216 |
| 6,016,540 A * | 1/2000 | Zaidi et al. | 712/214 |
| 6,065,105 A * | 5/2000 | Zaidi et al. | 712/23 |
| 6,334,182 B2 * | 12/2001 | Merchant et al. | 712/214 |
| 6,542,984 B1 * | 4/2003 | Keller et al. | 712/214 |
| 6,553,482 B1 * | 4/2003 | Witt | 712/216 |
| 6,557,095 B1 * | 4/2003 | Henstrom | 712/216 |
| 6,662,293 B1 * | 12/2003 | Larson et al. | 712/216 |
| 6,862,676 B1 * | 3/2005 | Knapp et al. | 712/217 |
| 6,988,183 B1 * | 1/2006 | Wong | 712/208 |
| 7,549,095 B1 * | 6/2009 | Alexander et al. | 714/709 |
| 7,711,929 B2 * | 5/2010 | Burky et al. | 712/217 |
| 2007/0043932 A1 * | 2/2007 | Kulkarni et al. | 712/214 |
| 2007/0088918 A1 * | 4/2007 | Venkatrao | 711/154 |
| 2010/0064121 A1 * | 3/2010 | Alexander et al. | 712/215 |
| 2010/0250902 A1 * | 9/2010 | Abernathy et al. | 712/216 |
| 2010/0257339 A1 * | 10/2010 | Brown et al. | 712/214 |
| 2010/0257341 A1 * | 10/2010 | Brown et al. | 712/216 |
| 2010/0332806 A1 * | 12/2010 | Golla et al. | 712/216 |

OTHER PUBLICATIONS

Dezso Sima, "Superscaler Instruction Issue" Kando Polytechnic Budapest, IEEE Sep./Oct. 1997, p. 28-39.
Jaume Abella, Ramon Canal and Antonio González "Power and Complexity Aware Issue Queue Designs" Universitat Politècnica de Catalunya and Intel Barcelona Research centre. Published by the IEEE Computer Society Sep./ Oct. 2003, p. 2-10.
Robert P. Colwell and Randy L. Steck, "TP 10.4: A 0.6 μm BiCMOS Processor with Dynamic Execution" Intel Corporation, Hillsboro, OR 1995 IEEE International Sold-State Circuits Conference, p. 176-177 and p. 361.
Dezso Sima, "Design Space of Shelving" Kando Polytechnic Budapest, Sep. 3, 1999, p. 1-32.

* cited by examiner

*Primary Examiner* — Eddie P Chan
*Assistant Examiner* — Keith Vicary (57) ABSTRACT

A device and method may fetch an instruction or microoperation for execution. An indication may be made as to whether the instruction is dependent upon any source values corresponding to a set of previously fetched instructions. A value may be stored corresponding to each source value from which the first instruction depends. An indication may be made for each of the set of sources of the instruction, whether the source depends on a previously loaded value or source, where indicating may include storing a value corresponding to the indication. The instruction may be executed after the stored values associated with the instruction indicate the dependencies are satisfied.

12 Claims, 4 Drawing Sheets

SYSTEM AND METHOD FOR RESERVATION STATION LOAD DEPENDENCY MATRIX

BACKGROUND

Processors may be used for executing one or more macro-instructions. Processors may include one or more execution units (EUs).

A processor having a plurality of execution units may include an out-of-order (OOO) subsystem to use the EUs in an efficient manner. The OOO subsystem may enable more than one microinstruction (uop) to be executed at the same time, although the uops may be executed in a different order than the order in which they were received by the OOO subsystem. The OOO subsystem may control the execution of uops by, for example, keeping records of the completion of load operations of uops and/or operands and of the dependencies of a certain uop on the completion of previous load operation.

The OOO subsystem may also include a reservation station (RS) to dispatch the uops to the different EUs. The RS may store a uop and source operands to be used for executing the uop. The RS may transfer the source operands and the uop to an EU intended to execute the uop, e.g., when the EU is available, and upon completely receiving the source operands. The EU may execute the uop using the source operands received from for example a register file (RF) or from a bypass network.

Additional uops which are waiting for data of the same load operation may be also considered to be dependent on that load operation. A load operation may fail, and in case of a failure the operations which await the data associated with that load operation may need to be identified to be rescheduled for additional data loading. Solutions which check the list of waiting uops to identify which of them need to be rescheduled following the end of every load operation may impose high computational and electrical load on the processor and may therefore slow the operation of the processor and increase its power consumption.

BRIEF DESCRIPTION OF THE DRAWINGS

The subject matter regarded as at least one embodiment of the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of embodiments of the invention. However, it will be understood by those of ordinary skill in the art that embodiments of the invention may be practiced without these specific details. In other instances, well-known methods, procedures, components and circuits have not been described in detail so as not to obscure embodiments of the invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention include an apparatus for performing the operation herein. This apparatus may be specially constructed for the desired purposes, or it may include a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), random access memories (RAMs), etc.

The processes presented herein are not inherently related to any particular computer or other apparatus. Various general-purpose systems may be used with programs in accordance with the teachings herein, or it may prove convenient to construct a more specialized apparatus to perform the desired method. In addition, embodiments of the present invention are not described with reference to any particular programming language.

Methods described herein may be implemented in machine-executable instructions. Methods described herein may be provided as a computer program product that may include a machine-readable medium having stored thereon instructions that may be used to program a computer (or other electronic devices) to perform such a method. "Machine-readable medium" may include any medium that is capable of storing or encoding a sequence of instructions for execution by a machine, such as solid-state memories and optical and magnetic disks.

Although the scope of the embodiments of the invention is not limited in this respect, the system and method disclosed herein may be implemented in wireless, handheld and portable communication devices, such as for example wireless and cellular telephones, smart telephones, personal digital assistants (PDAs), web-tablets and any device that may provide wireless access to a network. It should be understood that the embodiments of the invention may be used in a variety of applications.

Figure 1:
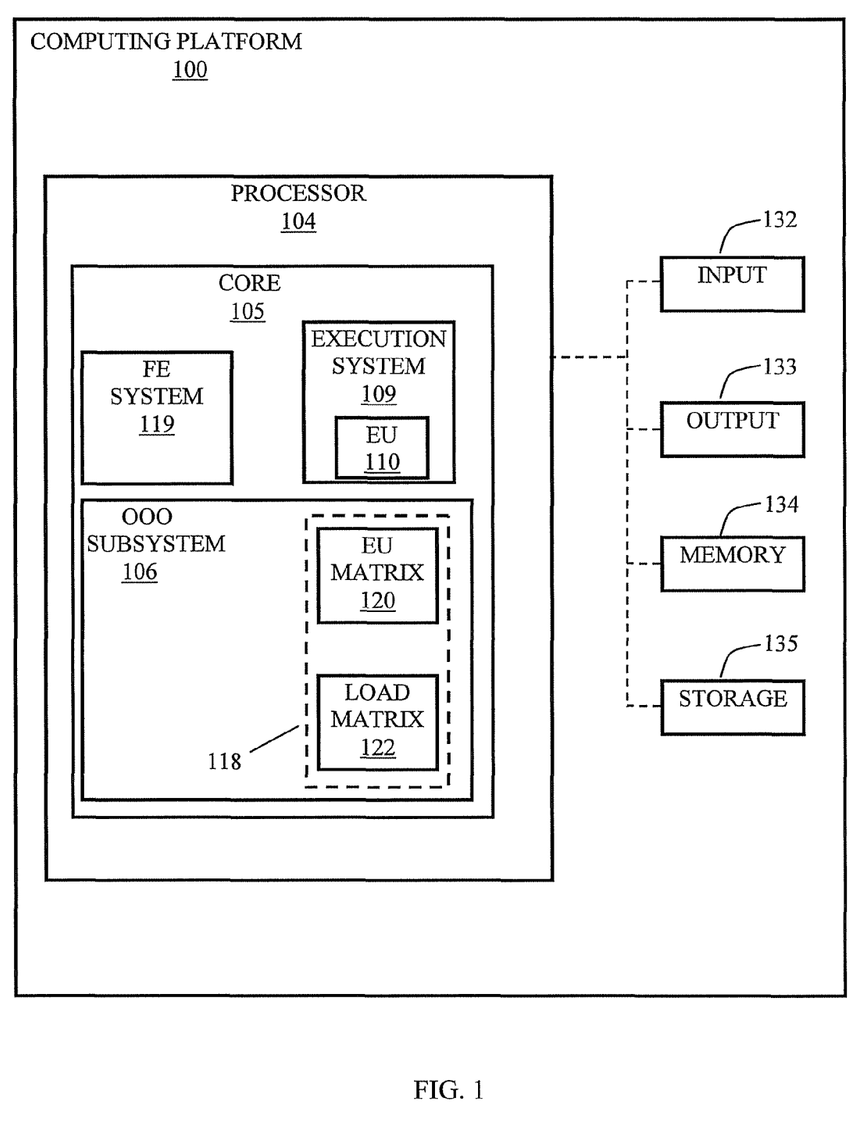
FIG. 1 is a schematic illustration of a computing platform including a processor core in accordance with embodiments of the invention.

Reference is made to FIG. 1, which schematically illustrates a computing platform in accordance with some demonstrative embodiments of the invention.

In some embodiments of the invention, computing platform 100 may include or may be a portable computing platform, which may be, for example, powered by a portable power source, e.g., a battery. Computing platform 100 may include or may be a non-portable computing platform.

Although embodiments of the invention are not limited in this respect, platform 100 may include or may be, for example, a personal computer, a desktop computer, a mobile computer, a laptop computer, a notebook computer, a terminal, a workstation, a server computer, a Personal Digital Assistant (PDA) device, a tablet computer, a network device, a micro-controller, a cellular phone, a camera, or any other suitable computing and/or communication device. The term "instruction" when used herein may refer to, for example, a macro-instruction or a uop.

Platform 100 may include a processor 104. Processor 104 may include or may be, for example, a central processing unit (CPU), a digital signal processor (DSP), a microprocessor, a host processor, a plurality of processors, a controller, a chip, a microchip, or any other suitable multi-purpose or specific processor or controller.

According to some demonstrative embodiments of the invention, processor 104 may include one or more processor cores 105 able to receive one or more macro-instructions, decode the macro-instructions into uops, and execute the uops. Design considerations, such as, but not limited to, processor performance, cost and power consumption, may result in a particular design of processor core 105. Although the scope of the embodiments of the invention are not limited in this respect, processor core 105 may be designed for OOO execution of uops. For example, processor core 105 may be capable of executing uops according to availability of source operands and/or execution resources within processor core 105, e.g., not necessarily according to the order in which the uops were decoded from the macro-instructions. In some cases, a uop generated from a particular macro-instruction may be executed after a uop generated from a later macro-instruction.

Processor core 105 may include an execution system 109 including at least one execution unit (EU) 110. Processor core 105 may also include an OOO subsystem 106. Processor core 105 may include an instruction fetch (FE) unit 119 which may for example fetch instructions to be executed.

According to some demonstrative embodiments of the invention, platform 100 may also include an input unit 132, an output unit 133, a memory unit 134, and/or a storage unit 135. Platform 100 may additionally include other suitable hardware components and/or software components.

Input unit 132 may include, for example, one or more of a keyboard, a mouse, a touch-pad, or other suitable pointing device or input device. Output unit 133 may include, for example, one or more of a Cathode Ray Tube (CRT) monitor, a Liquid Crystal Display (LCD) monitor, or other suitable monitor or display unit.

Memory unit 134 may include, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units or storage units. Memory unit 134 may store, for example, one or more values, such as data to be used as source value, corresponding to a uop (e.g., memory or other data used by the uop) to be executed by execution system 109.

Storage unit 135 may include, for example, a hard disk drive, a floppy disk drive, a Compact Disk (CD) drive, a CD-Recordable (CD-R) drive, or other suitable removable and/or fixed storage unit.

OOO subsystem 106 may include, for example a reservation station (RS) 118 which may include or otherwise be associated with execution unit (EU) dependency matrix 120 and load dependency matrix 122. EU matrix 120 and load matrix 122 may be implemented for example as arrays in a memory device or unit in processor core 105. The term 'matrix' in this application includes any type of array or collection of data storage cells arranged to allow addressing of a single cell in the array by for example a two-dimensional addressing system such as, for example, addressing a storage data cell by the definition of its 'row' and its 'column'. Accordingly, 'row' and 'column' may relate to any suitable addressing measures defining a first and a second location coordinates in that array, and do not necessarily refer to a physical "row" or "column" or imply a specific orientation of data cells. Furthermore, the data stored in matrices 120 and 122 need not be arranged in two 2-dimensional grids; the depiction of such grids in the Figures is for clarity, and in various embodiments of the invention the actual data may be stored in any suitable data structure.

Figure 2:
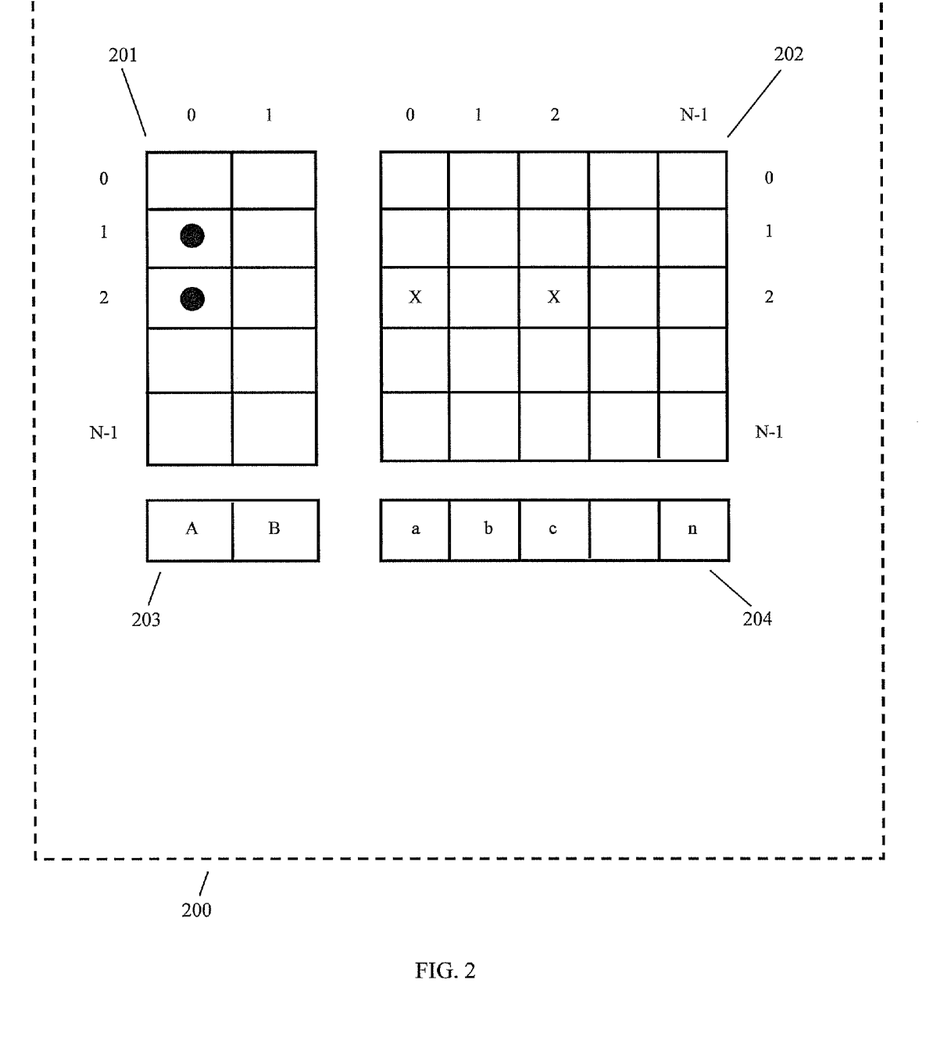
FIG. 2 is a schematic illustration of a reservation station in accordance with embodiments of the invention.

Reference is made to FIG. 2, which conceptually illustrates RS 200. RS 200 may include or otherwise be associated with for example execution matrix 202 and load matrix 201. In some embodiments of the invention execution matrix 202 may correspond to EU matrix 120 of FIG. 1 and load matrix 201 may correspond to load matrix 122 of FIG. 1. A uop may be allocated into execution matrix 202 for to allow storage of indications or values of dependencies of that uop on the execution of other uop(s), while the values corresponding to the dependency of a uop on LOAD uop(s) may be stored or indicated in load matrix 201. The dependency of a uop on non-load uops may be tracked in execution matrix 202 while dependency of a uop on LOAD uops is tracked in load matrix 201.

Execution matrix 202 may be implemented as an array of memory cells having the dimensions of N×N (N columns and N rows). However other implementations are possible, and the data in matrices 201 and 202 may be stored together. Each uop or other instruction that is fetched for execution but has not yet been executed may be allocated a row and each uop on the execution of which at least one other uop depends may be allocated a column in execution matrix 202. The dependency of a first uop on the execution of a second uop may be indicated in execution matrix 202 in a cell located in the intersection of the row allocated to the first uop with the column allocated to the second uop. Upon allocation of a row in load matrix 201 and in execution matrix 202 to store information regarding a newly fetched uop, dependencies on a load uop of previously fetched uop, as indicated in load matrix 201, may be reflected as an indirect dependency of the newly fetched uop on these load uops, if the new uop depends on at least one of the previously fetched uops which depend on a load uop. An indirect dependency of a newly fetched uop on a load uop may occur, for example, when it is dependent on a previously fetched uop which depends on a load uop. Such an indirect dependency may be indicated in a cell in load matrix located in the row associated with the newly fetched uop and in the column associated with the load uop from which it depends.

LOAD uops may differ from other, non-load types of uop at least in the likelihood of successful completion of execution of each of them. While the execution of a non LOAD uop may fail only rarely a LOAD uop is more likely to fail.

Load matrix 201 may be implemented as an array of memory cells having the dimensions of N×M (N columns and M rows). Each uop or other instruction that is fetched for execution and that has not yet been executed may be allocated a row in load matrix 201. Each LOAD uop may be allocated one column in load matrix 201. The dependency of a uop on the execution of a LOAD uop may be indicated in load matrix 201 in a cell located in the intersection of the row allocated to the uop with the column allocated to the LOAD uop. For example, a dependency indication mark or value may be placed at a cell located in the intersection of the row allocated to a uop depending on a LOAD uop with a column allocated to that LOAD uop.

A memory cell in each position in the array of load matrix 201 and execution matrix 202 may be adapted to receive, store and delete a value indicative of a dependency. For example, if a cell in load matrix 201 holds the value "0" it may be indicative that the uop associated with the row of that cell is not dependent on the completion of a load operation corresponding to the column of that cell. The value "1" in that cell may indicate, for example, that the uop associated with the row of that cell depends on a value of a load operation to be produced by the load uop associated with the column of that cell. While 1 and 0 are used for values for specific situations, other symbols may be used, and the use of 1 and 0 may be reversed.

Each row in load matrix 201 may be regarded as an entry representing a uop that may depend on load operation(s). Each column in load matrix 201 may represent a specific load operation and can be used to monitor the dependency of uops (each allocated to one row) on the completion of the load uop allocated to that column. For example, in order to indicate that the uop allocated to entry, or row, number 2 in load matrix 201 depends on the completion of a load operation of uop allocated to entry number 1, a dependency indication value, for example "1", may be written to the cell at the intersection of row 2 with column 1. Additionally, single-dimensional cell array 204 may represent the physical destination (PDSTs) memory units identifier, such as registers, of the uops represented in the respective columns of execution matrix 202 for a non-load uops. For example cell "a" in cell array 204 may identify the PDST for the non-load uop allocated to column 0. Each cell in array 203 may represent the PDST identifier of the load uop allocated to the respective column in load matrix 201. While 1 and 0 are used for values for specific situations, other symbols may be used, and the use of 1 and 0 may be reversed.

Execution matrix 202 may be implemented, for example, as an array of memory, registers, cache, or other storage cells having the dimensions of N×N columns and rows for indications of dependency. The number of rows N is identical to the number of rows in load matrix 201.

The columns in load matrix 201 may be associated with load instructions such as uops. Thus, dependency of a uop of any type on a load instruction or uop may be indicated in the intersection of the row associated with that uop with the column associated with the load uop. While the number of rows in load matrix 201 may be identical to the number of rows of execution matrix 202, for example N, the number of columns M of load matrix 201 may vary. In one embodiment, the minimum number of columns Mmin may be, for example, 2 to allow indication of dependency for two sources of a uop. In one embodiment, the maximum number of columns Mmax may be derived, for example, from the maximum expected number of load uops that may need to be represented for a given N. For example, in one implementation, for N=52, M=34 was found to give good performance of RS 118. Other numbers may be used. The memory cell in each position in the array of load matrix 201 may be adapted to receive, store and delete a value indicative of the dependency of a uop or other instruction associated with a given row on load uops, e.g., previously fetched load instructions. Each intersection of a row (associated with a uop) and column (associated with a load uop) may indicate the dependency of the uop on the load uop source.

Execution matrix 202 may store in a memory location associated with each row, a value indicative of the status of a respective uop. A status of a uop associated with a row in matrices 201 and 202 may be, for example, "ready", "tentative", or "cancelled." Other status identifiers may be used. The status "ready" may indicate that the uop associated with that row is not dependent on any specific column, e.g. that the uop is not dependent on the execution of any uop. This status may indicate that no dependency was set upon allocation or, if dependency was set upon allocation the uop on which it was depending successfully completed its non speculative WB. The status "depending" may indicate that the uop associated the row in which the dependency was marked is waiting for speculative WB of a producer uop (e.g., execution type uop in execution matrix 202 or load type uop in load matrix 201). When speculative WB for all uops in a row is received, the status of the respective row may be set to "speculative ready". When no cancellation is received on non-speculative WB then the status of that row may be set to ready.

During the operation of processor 104 uops may be dispatched for execution, according to for example one or more programs that are executed by processor 104. Uops may need one or more operands or values to be execute, and the result of the execution of the uop may be a single value, although other combinations are possible. According to embodiments of the invention upon allocation of a uop, a physical storage locations identifier, that corresponds, for example, to a location in an RF, may be allocated to hold the result of the operations of processor 104 and the source operands may be renamed into their location in the RF as provided by their appropriate identifiers. Physical storage locations used for holding source operands may be referred to as for example Physical Sources (PSRC), and a physical storage location for holding the result value may be referred to as a PDST.

When multiple instructions such as uops are being executed, the execution of some may depend on the execution of other uops. For example, according to a program being executed by processor 104 the result of one uop may be an operand used by another uop. More than one uop may depend on one variable or operand which may be, for example, the result of an execution of another uop. Execution of a uop may last one or more processor cycles. When a uop is allocated into RS 118 its length, for example in number of processor cycles, may be known and may be recorded when the uop is allocated. Thus, upon allocating of a uop its length in cycles and the PDSTs and PSRC memory units that were allocated to it may be recorded. Since different uops may have different lengths, the dispatch and execution of a first uop which began before the execution of a second uop may end after the end of the execution of the second uop. In order to track and control the timing and order of the execution of uops processor 104 may keep for example a registry indicating for each uop which is waiting to be executed and/or is being executed the uop length, and the PDSRCs and PPDST that were allocated to it. Further, processor 104 may have a mechanism for identifying the uops that are waiting for data to become valid, e.g. to be fully loaded or to become valid and available at the end of execution of a uop.

Some known mechanisms involve identifying dependencies that became valid and their associated dependees by for example performing a compare function at the end of each cycle or at the completion of the execution of each uop. One mechanism used may be the Content-Addressable Memory (CAM) mechanism; other methods may be used. One of the known solutions which uses CAM uses a Reservation station (RS) in which each entry represents a uop that can identify the end of each completion of load or execution of a uop, comparing the sources of that uop against the uop that is signaling its completion using a CAM function to verify if it is depending on the currently produced value. The execution of such a comparison at the end of each cycle for every source of every uop that awaits execution may load processor 104 with a large number of CAM operations and may increase power consumption. The load dependency and cancellation due to a load cancellation may be broadcast along each source of each uop starting from the CAM match for a load operation.

According to embodiments of the present invention, instead of using an RS with CAMs at execution for both uops and load of values, processor 104 may use two matrices, for example execution matrix 202 for indicating dependency of uops on non-load uops and a load matrix 201 for indicating dependency of uops on load uops. Load matrix 201 may be used to track on the dependency of pending uops and load operations on the successful results of load operations. According to embodiments of the invention each row in load matrix 201, for example rows 0, 1, 2 . . . N−1, may be associated with one uop. While two matrices are described, in other embodiments other numbers of matrices may be used.

Execution matrix 202 may control the valid generation of each uop and tracking logic that is not part of the matrix may track the duration when data is located in bypass levels indicating propagation of data associated with uops lasting more than one cycle. Execution matrix 202 may further replace the traditional RS as known in the art and the CAM logic during write-back (WB). Load matrix 201 may monitor the loads from the allocation stage until the successful WB of a load is executed.

During the use or operation of execution matrix 202 and load matrix 201 load matrix 201 may hold the PDSTs of all active loads (e.g., loads that have not successfully completed yet). On allocation of a new uop to matrices 201 and 202, a processor 104 may compare a loaded uop's PSRCs against all live loads, e.g., loads of uops which were not yet completed, in load matrix 201, for example using comparators. In case of a match, the appropriate column may be marked or have a value stored in it at the newly allocated row associated with the new uop being loaded. For example, a uop that was allocated to entry 1 in matrices 201 and 202 depends, in the specific example here, on PSRCs A in array 203 as indicated in the figure by the small circle marked in the intersection of row 1 with column A (in an actual matrix, typically a binary symbol or value represents what in the figure may be a notation such as a circle). These marks or values may be considered for source ready calculation. In one embodiment an entry in matrices 201 and 202 is not be considered ready while it has at least one such mark. On allocation, each load uop allocates a column in load matrix 201. Load matrix 201 may use the comparator results of the execution matrix 202 setup stage, for example as described herein, to configure its own values.

On allocation of a uop into matrices 201 and 202, the processor may read the load dependencies as indicated in load matrix 201 of the entries on which it depends. These dependencies may be merged with the uop's direct dependencies on load uop. This may provide a full dependency chain of load for each allocated uop in RS 118. These dependencies on loads have no specific length and may span over more than the maximal length of a load. This may provide an ability to extend the load dependency chain substantially as may be needed; however, other or different benefits may be realized.

When a load is about to write back (WB), load matrix 201 may receive the load matrix column identifier associated with this load in the load matrix from a memory control unit, such as a Memory Cluster (MEU) and that identifier may notify all uops that depend on that load by for example setting the column associated with that load. In EU matrix 202 or load matrix 201 dependency marks may be changed to for example "tentative", for example by changing the value in the respective cells of load matrix 201 to a number or symbol other than "0" or "1", so as to allow the uops depending on that load to become "ready". In case the load fails or gets cancelled, an appropriate indication may be sent by the MEU to that load uop and all other uops depending on it to be rescheduled since they depend on the canceled load. In this case load matrix 201 may set the dependency marks of the associated entries back and send cancellation for all the uops that are waiting for the load completion or are waiting for their dispatch since they depend on the canceled load. Load matrix 201 can also remove the ready indication making all dependent uops "not ready". Status identifiers such as "tentative" and "ready" may correspond to values, typically binary values. An indirect dependency of a uop on a load uop may be indicated in the respective row and column(s) of load matrix 201. This may allow de-allocation of a row with an indication of a dependency of previously fetched uop from execution matrix 202, after that previously fetched uop has been executed, while the respective row in load matrix 201 may still be in use, if a dependency of the uop on the successful completion of a load uop has not yet been satisfied.

Load matrix 201 may broadcast cancellation information to the RS such that if a load WB is declared as invalid, it may send its cancellation which may immediately clear "speculative ready" of all dependent uops (directly or part of a dependency chain). This may be implemented as a direct cancellation line that de-asserts the "speculative ready" or it can be identified by de-assertion of "speculative ready" before the number of clock cycles of the "speculative ready" is sent.

A successful WB of a load may cause sending of load completion indication. This may de-allocate the load entry, which is the associated column, and may remove the dependency on that load from the matrices.

There may be a connection between the setup stage of execution matrix 202 executed at allocation and load matrix 201. In order to obtain the entire load dependency chain, each allocating uop may determine its dependency from the uop dependency stored in execution matrix 202, for example as found using comparators in the setup stage of execution matrix 202. The dependency may further be based on for example inline dependency indication as may be received from for example a Register Alias Table (RAT), providing the location of registers used, for example, for PDST or PSRC, to read their dependency upon load and to store the dependency in load matrix 201. The data may then be merged with load matrix 201 dependency of the allocated uop as received from the comparators executed in the setup stage of load matrix 201 and written to load matrix 201, into the entry of the allocated uop. For example, the uop in RS entry 2 depends on PSRCs 'a' and 'c', as indicated in execution matrix 202 by an 'X'. While none of these is PDST of load uop, load matrix 201 dependencies of both of them are being copied in this case. RS entry 1 may be marked as dependent on load uop in load matrix 201 column 0 (PDST A).

A compare operation similar to the CAM operation, to identify dependencies, may need to be performed only once every new allocation of a uop. From that time onward, the dependencies of non-load uops on uops and of uops on loads are indicated by the dependency indicators in matrices 202 and 201. Moreover, the dependencies may be kept and tracked beyond the direct predecessors, thus allowing a full chain of load dependency to be monitored by a matrix structure. Further, since the dependency may be maintained indefinitely, the load dependencies may have no specific clock length limitation and may span over more than the maximal load latency and several load ports can be used with no additional complexity added. The cancellation of a dependency chain that depends on a load may be done at once for all uops in the chain regardless of their location in the dependency chain.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

Figure 3A:
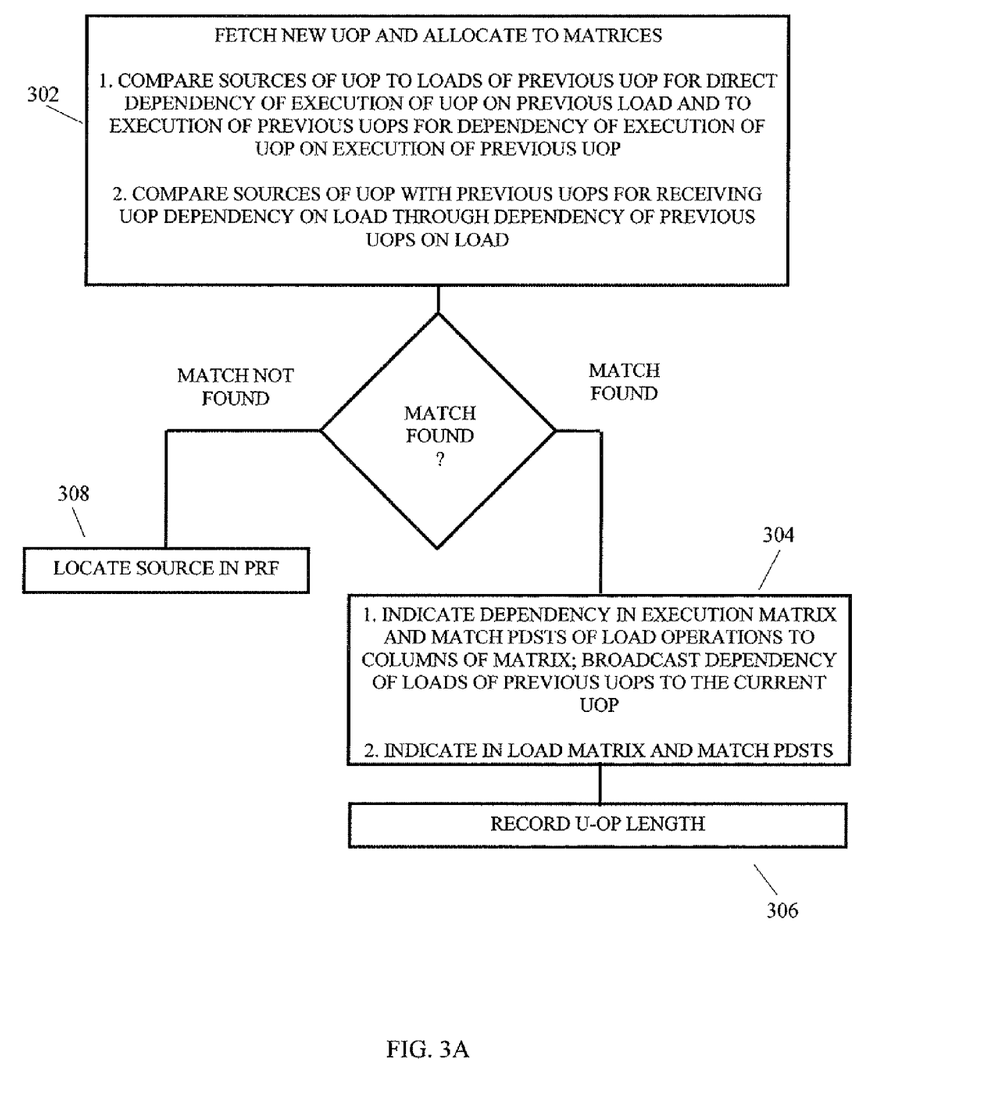
FIG. 3A is a schematic flow diagram of allocation of a uop in execution and load matrices in accordance with embodiments of the invention.

Reference is made now to FIG. 3A, which is a schematic flow diagram of the process of an allocation of a uop in accordance with embodiments of the invention. The operations shown below, such as for example comparing values and maintaining matrices, may be in one embodiment performed by a processor such as processor 104, or the components of a processor.

When a uop or other instruction is fetched for execution it may be allocated to matrices such as an execution matrix and a load matrix. In one embodiment, in both matrices, the uop occupies the same row (e.g., row 1 in both matrices), but in other embodiments the same row need not be used. Upon allocation of the uop a compare of the address of storage location of source data (and possibly of destination data) of the new uop to those of uops already allocated in matrices such as matrices 201 and 202 may be performed to identify or determine a dependency of the newly fetched uop on the data corresponding to entries already allocated in the matrices and for dependency of loads on uops already allocated in the matrices (block 302). An indication may be made of the dependency of the new instruction on source values corresponding to previously fetched or allocated instructions. The indicating may include storing values corresponding to source values from which the instruction or uop depends. The instruction may be associated with the stored value. Indirect dependency of a uop on previously fetched uop which depends on load uop may be indicated in load matrix 201 (block 302).

Since, in one embodiment, each row in each matrix corresponds to a uop, the processor may determine or indicate an execution dependency for each of the set of sources of a uop, the dependencies reflecting whether or not the source depends on a previous loaded value or source value, and the dependencies may be placed in a row in a first matrix corresponding to the uop. The sources of the uop may be compared to the execution of previous loaded uops to determine, for each source, if a dependency exists. The results may be placed as a status or value, for example in a row of a matrix corresponding to the uop and it may provide its accumulated (linked) dependency on each load. The indicating may include storing values corresponding to source values from which the instruction or uop depends. The instruction may be associated with the stored value.

If a match of the addresses of source data of a new uop to load addresses of uops previously allocated in the matrices is found an indication or value may be placed in the execution matrix. If a match of load addresses of the new uop to addresses of uops already in the execution matrix 202 is found an indication or value may be placed in the load matrix (block 304).

Along with the allocation of a new uop in the matrices, the length of the uop may be recorded or associated with the uop (e.g., with the row) in either or both of the matrices corresponding to the uop (block 306). In the case that no match of the newly fetched uop to entries in the matrices was found the respective source may be located in an RF such as a physical RF (PRF) (block 308).

After a uop has been allocated to the matrices, the sources of uops compared with loads and destinations of previous uops, and the dependencies have been marked in the execution matrix and the load matrix, the processor may continue to fetch and execute uops. When an instruction is executed, the values or indications corresponding to the destination values associated with the instruction may be changed in entries for other instructions depending on the execution of that instruction.

Figure 3B:
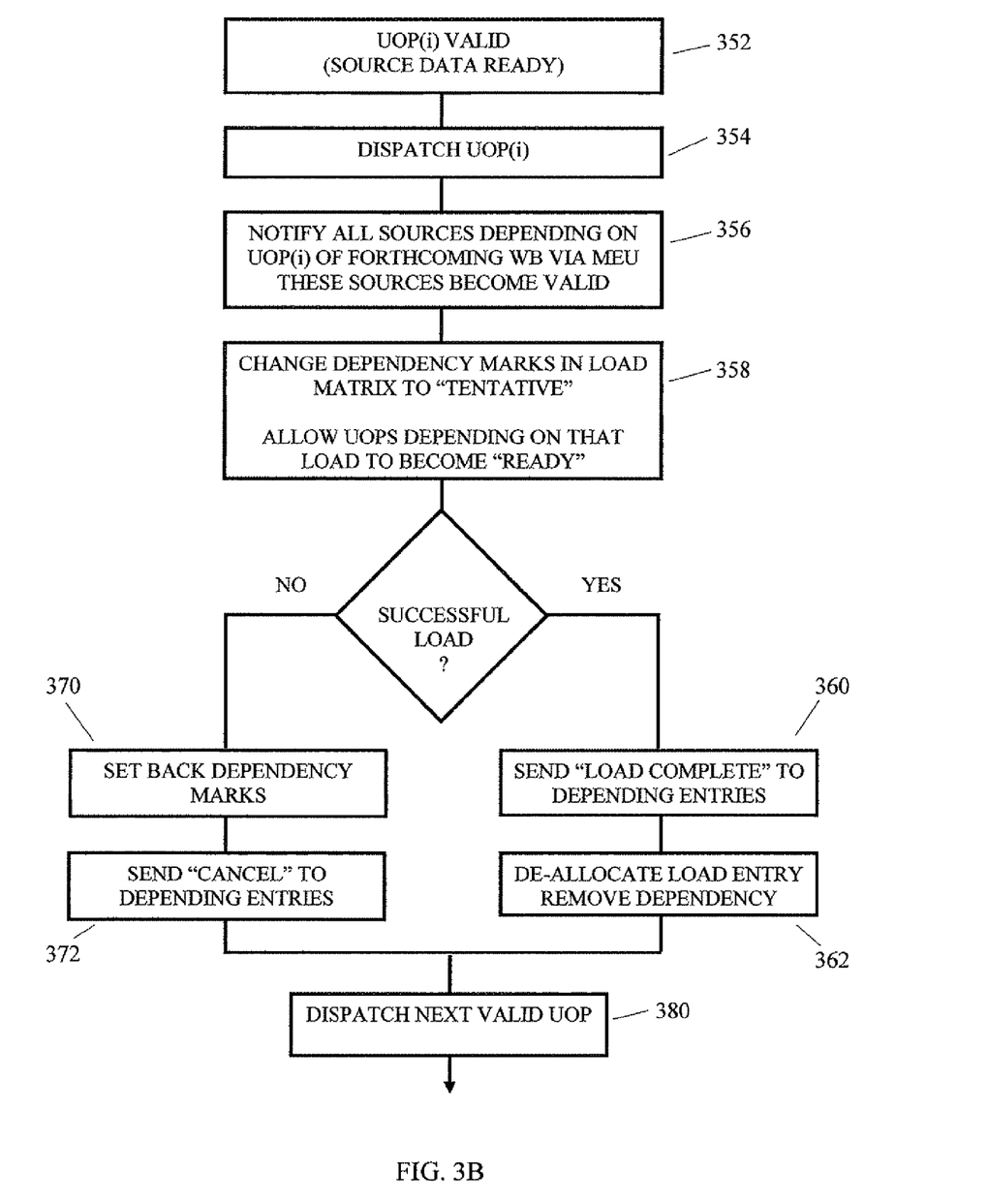
FIG. 3B is a schematic flow diagram of execution of a uop in an execution matrix and a load matrix in accordance with embodiments of the invention.

Reference is made now to FIG. 3B, which is a schematic flow diagram of the execution of a uop using an execution matrix and a load matrix in accordance with embodiments of the invention.

A status of a uop allocated in the matrices may be indicated in a memory storage associated with the row in which that uop is allocated, such as register, memory cells and the like. A uop(i) that was previously allocated in the matrices may have its status indication changed to "ready" when its sources are ready (block 352), and the dependencies in the rows in the matrices corresponding to the uop are satisfied. When this occurs, uop(i) may be dispatched for execution (block 354).

Upon beginning of execution of uop(i) a notification of a forthcoming WB, based on previous recordation of the execution length of uop(i), may be sent to all the depending sources in the matrices via, for example, a memory execution unit and their status changed to for example "valid" (block 356). The value or indication corresponding to a previously fetched instruction from which an instruction depends may be thus altered upon the receipt of a WB notification of the previously fetched instruction. A dependency indication in the load matrix for which the status of all required sources was changed to "valid" may have its status changed to "tentative" and the respective uops may change their status to "ready" (block 358).

Execution of a uop may involve loading of one or more operands. In the case that the load operation has completed successfully a "load complete" indication may be sent to all entries depending on the successful load of the uop (block 360). For example, a column corresponding to uop may have its status changed. Additionally, entries for which all sources were loaded successfully may be de-allocated from the matrices and the dependencies from them may be removed (block 362). This removal may include altering values in data structures such as matrices that correspond to the source. In the case that a load operation was unsuccessful dependency of the entries depending on the unsuccessful load operation may be set back to initial state (block 370) and a "cancel" notification may be sent all depending entries (block 372). At this point in the execution cycle another valid uop may be dispatched for execution (block 380).

While certain labels or indications are used within the matrices (e.g., "cancel", "ready"), these labels are part of one embodiment, and other suitable labels or indications may be used. Further, their representations in matrices may be, for example, in binary codes. E.g., a three-bit code may represent eight different such labels or indications.

While certain features of embodiments of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of embodiments of the invention.

What is claimed is:

1. A method comprising:
fetching a first instruction;
indicating whether the first instruction is dependent upon the execution of an instruction in a set of previously fetched instructions, wherein indicating whether the instruction is dependent upon the execution of an instruction includes storing at least one value corresponding to each previously fetched instruction from which the first instruction depends, wherein the stored value is associated with the first instruction;
indicating whether the first instruction depends on a load instruction in a set of previously fetched load instructions, wherein indicating whether the instruction depends on a load instruction includes storing at least one value corresponding to each of the previously fetched load instructions from which the first instruction depends, wherein the stored value is associated with the first instruction; and
executing the first instruction after the stored values associated with the instruction indicate the dependencies are satisfied,
wherein upon fetching of the first instruction, allocating the instruction to a first data structure and a second data structure, the first data structure storing a set of values corresponding to each source value resulting from execution of previously fetched instructions from which the first instruction depends, and the second data structure storing a set of values corresponding to each source value resulting from execution of previously fetched load instructions from which the first instruction depends.

2. The method of claim 1, comprising altering the value corresponding to a previously fetched instruction from which the first instruction depends upon a receipt of a writeback notification of the previously fetched instruction.

3. The method of claim 1 comprising associating with each entry in said first data structure the execution length of the instruction associated with the entry.

4. The method of claim 1, comprising, when a second instruction is executed, altering the values corresponding to a destination value associated with the second instruction.

5. The method of claim 1, comprising, when data from a load instruction is successfully loaded, altering the values corresponding to the load instruction.

6. The method of claim 1, comprising, when fetching a second instruction,
indicating whether the second instruction depends on a previous instruction which in turn depends on load instruction in a set of previously fetched load instructions, wherein indicating whether the second instruction depends on a previous instruction which depends on a previously fetched load instruction includes storing at least one value corresponding to each of the previously fetched load instructions from which the first instruction depends, wherein the stored value is associated with the second instruction and with the previously fetched load instruction.

7. A hardware processor comprising:
a fetch unit;
an execution unit;
wherein the processor is to:
fetch a first instruction;
indicate whether the first instruction is dependent upon the execution of an instruction in a set of previously fetched instructions, wherein indicating whether the instruction is dependent upon the execution of an instruction includes storing at least one value corresponding to each previously fetched instruction from which the first instruction depends, wherein the stored value is associated with the first instruction;
indicate whether the first instruction depends on a load instruction in a set of previously fetched load instructions, wherein indicating whether the instruction depends on a load instruction includes storing at least one value corresponding to each of the previously fetched load instructions from which the first instruction depends, wherein the stored value is associated with the first instruction; and
execute the first instruction after the stored values associated with the instruction indicate the dependencies are satisfied,
wherein upon fetching of the first instruction, allocating the instruction to a first data structure and a second data structure, the first data structure storing a set of values corresponding to each source value resulting from execution of previously fetched instructions from which the first instruction depends, and the second data structure storing a set of values corresponding to each source value resulting from execution of previously fetched load instructions from which the first instruction depends.

8. The hardware processor of claim 7, wherein the processor is to alter the value corresponding to a previously fetched instruction from which the first instruction depends upon a receipt of a writeback notification of the previously fetched instruction.

9. The hardware processor of claim 7 wherein the processor is to associate with each entry in the data structure a status indicator having one of a plurality of values corresponding to the instruction associated with the entry, the plurality of values comprising ready, tentative and cancelled.

10. The hardware processor of claim 7 wherein the processor is to associate with each entry in the data structure the execution length of the instruction associated with the entry.

11. The hardware processor of claim 7, wherein, when a second instruction is executed, the processor is to alter the values corresponding to a destination value associated with the second instruction.

12. The hardware processor of claim 7, wherein, when data from a load instruction is successfully loaded, the processor is to alter the values corresponding to the load instruction.

* * * * *